US009799257B2

(12) United States Patent
Tian et al.

(10) Patent No.: US 9,799,257 B2
(45) Date of Patent: Oct. 24, 2017

(54) HIERARCHICAL PREDICTION FOR PIXEL PARAMETER COMPRESSION

(71) Applicant: SAMSUNG DISPLAY CO., LTD., Yongin, Gyeonggi-Do (KR)

(72) Inventors: Dihong Tian, San Jose, CA (US); Ning Lu, Saratoga, CA (US)

(73) Assignee: Samsung Display Co., Ltd., Yongin-si (KR)

(*) Notice: Subject to any disclaimer, the term of this patent is extended or adjusted under 35 U.S.C. 154(b) by 140 days.

(21) Appl. No.: 14/720,669

(22) Filed: May 22, 2015

(65) Prior Publication Data

US 2015/0348458 A1 Dec. 3, 2015

Related U.S. Application Data

(60) Provisional application No. 62/006,725, filed on Jun. 2, 2014.

(51) Int. Cl.
*G06K 9/36* (2006.01)
*G09G 3/20* (2006.01)
*G09G 3/3225* (2016.01)

(52) U.S. Cl.
CPC ......... *G09G 3/2074* (2013.01); *G09G 3/2007* (2013.01); *G09G 3/3225* (2013.01); *G09G 2340/02* (2013.01)

(58) Field of Classification Search
USPC ....... 382/162, 166, 238, 218, 173, 312, 175, 382/176, 263, 264; 345/77, 102, 204, 345/207, 208, 158, 214, 581, 589, 590, 345/600, 690
See application file for complete search history.

(56) References Cited

U.S. PATENT DOCUMENTS 6,636,635 B2 * 10/2003 Matsugu .................. G06K 9/20 382/218
6,993,184 B2 * 1/2006 Matsugu .................. G06K 9/20 382/173
8,531,379 B2 * 9/2013 Kerofsky ............ G09G 3/2007 345/102
9,330,630 B2 * 5/2016 Kerofsky ................ G09G 5/10

FOREIGN PATENT DOCUMENTS

KR 10-2012-0092982 A 8/2012
KR 10-2012-0135657 A 12/2012
KR 10-2014-0086619 A 7/2014

* cited by examiner

*Primary Examiner* — Anh H Do
(74) *Attorney, Agent, or Firm* — Lewis Roca Rothgerber Christie LLP

(57) ABSTRACT

A method for compensating pixel luminance of a display panel which includes receiving pixel parameters corresponding to sub-pixels of the display panel, receiving an input image, adjusting the input image according to the pixel parameters, and displaying the adjusted input image at the display panel. The pixel parameters include a first pixel parameter of a base luminance level of a base color channel, a first residual determined from performing inter-channel prediction, a second residual determined from performing inter-level prediction, and parameters used in the performing of the inter-level prediction.

20 Claims, 9 Drawing Sheets

HIERARCHICAL PREDICTION FOR PIXEL PARAMETER COMPRESSION

CROSS-REFERENCE TO RELATED APPLICATION(S)

The present application claims priority to and the benefit of U.S. Provisional Patent Application No. 62/006,725, filed on Jun. 2, 2014, and may also be related to co-pending U.S. patent application Ser. No. 14/658,039, filed on Mar. 13, 2015, the contents of which are all incorporated herein by reference in their entirety.

BACKGROUND

The present application relates to improving color variation of pixels in a display panel. More particularly, it relates to a hierarchical prediction for pixel parameter compression.

The display resolution of mobile devices has steadily increased over the years. In particular, display resolutions for mobile devices have increased to include full high-definition (HD) (1920×1080) and in the future will include higher resolution formats such as ultra HD (3840×2160). The size of display panels, however, will remain roughly unchanged due to human factor constraints. The result is increased pixel density which in turn increases the difficulty of producing display panels having consistent quality. Furthermore, organic light-emitting diode (OLED) display panels suffer from color variation among pixels caused by variation of current in the pixel driving circuit (thus affecting luminance of the pixel), which may result in visible artifacts (e.g., mura effect). Increasing the resolution or number of pixels may further increase the likelihood of artifacts.

The above information discussed in this Background section is only for enhancement of understanding of the background of the described technology and therefore it may contain information that does not constitute prior art that is already known to a person having ordinary skill in the art.

SUMMARY

According to an aspect, a method for compensating pixel luminance of a display panel is described. The method may include: receiving pixel parameters corresponding to sub-pixels of the display panel, the pixel parameters including: a first pixel parameter of a base luminance level of a base color channel; a first residual determined from performing inter-channel prediction; a second residual determined from performing inter-level prediction; and parameters used in the performing of the inter-level prediction; receiving an input image; adjusting the input image according to the pixel parameters; and displaying the adjusted input image at the display panel.

The received pixel parameters may be compressed pixel parameters.

The method may further include decompressing the compressed pixel parameters before adjusting the input image.

The pixel parameters may be compressed by: selecting, by a processor, the base color channel from a plurality of color channels; selecting, by the processor, the base luminance level of the selected base color channel from a plurality of luminance levels; determining, by the processor, the pixel parameter for the selected base color channel and the base luminance level; and predicting, by the processor, a second pixel parameter from the first pixel parameter to generate the first residual, the second pixel parameter corresponding to a color channel different from the base color channel, and corresponding to a same luminance level as the base luminance level.

The pixel parameters may be compressed further by: predicting, by the processor, a third pixel parameter from the predicted second pixel parameter to generate the second residual, the third pixel parameter corresponding to a same color channel corresponding to the second pixel parameter, and corresponding to a luminance level different from the luminance level corresponding to the second pixel parameter; and encoding the first pixel parameter, the first residual, and the second residual.

According to another aspect, a method for compressing pixel parameters is described. The method may include: selecting, by a processor, a base color channel from a plurality of color channels; selecting, by the processor, a base luminance level of the selected base color channel from a plurality of luminance levels; determining, by the processor, a first pixel parameter for the selected base color channel and the base luminance level; and predicting, by the processor, a second pixel parameter from the first pixel parameter to generate a first residual, the second pixel parameter corresponding to a color channel different from the base color channel, and corresponding to a same luminance level as the base luminance level.

The method may further comprise: predicting, by the processor, a third pixel parameter from the predicted second pixel parameter to generate a second residual, the third pixel parameter corresponding to a same color channel corresponding to the second pixel parameter, and corresponding to a luminance level different from the luminance level corresponding to the second pixel parameter; and encoding the first pixel parameter, the first residual, and the second residual.

The predicting the second pixel parameter may include an inter-channel prediction.

The second residual may be a difference between the second pixel parameter and the third pixel parameter.

The predicting the third pixel parameter may include an inter-level prediction.

The inter-level prediction may include performing a linear regression.

The first residual may be a difference between the first pixel parameter and the second pixel parameter.

The method may further include multiplexing the first pixel parameter, the first residual, and the second residual.

According to another aspect, a display panel may include: a memory including compressed parameters for sub-pixels of the display panel; a decoder configured to decompress the compressed parameters; and a processor configured to apply the decompressed parameters to input image signal, each parameter of the parameters corresponding to respective ones of the sub-pixels, wherein the parameters are compressed by: selecting a base color channel from a plurality of color channels; selecting a base luminance level of the selected base color channel from a plurality of luminance levels; determining a first pixel parameter for the selected base color channel and the base luminance level; predicting a second pixel parameter from the first pixel parameter to generate a first residual, the second pixel parameter corresponding to a color channel different from the base color channel, and corresponding to a same luminance level as the base luminance level; predicting a third pixel parameter from the predicted second pixel parameter to generate a second residual, the third pixel parameter corresponding to a same color channel corresponding to the second pixel parameter, and corresponding, to a luminance level different from the luminance level corresponding to the second pixel parameter; and encoding the first pixel parameter, the first residual, and the second residual.

The predicting the second pixel parameter may include an inter-channel prediction.

The predicting the third pixel parameter may include an inter-level prediction.

The inter-level prediction may include performing a linear regression.

The first residual may be a difference between the first pixel parameter and the second pixel parameter.

The second residual may be a difference between the second pixel parameter and the third pixel parameter.

The display panel may further include multiplexing the first pixel parameter, the first residual, and the second residual.

BRIEF DESCRIPTION OF THE DRAWINGS

The above and other aspects and features of the present invention will become apparent to those skilled in the art from the following detailed description of the example embodiments with reference to the accompanying drawings.

DETAILED DESCRIPTION

Figure 1:
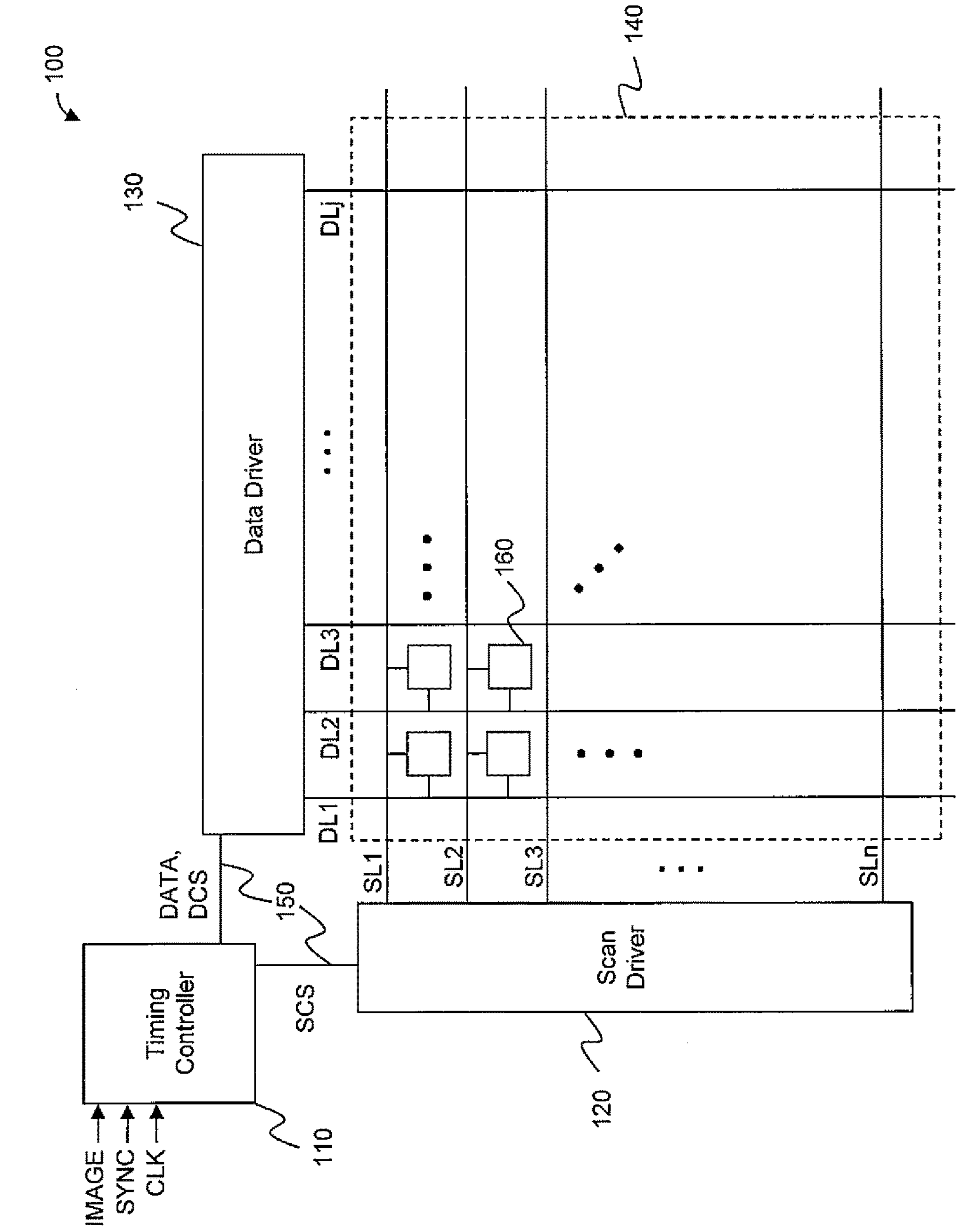
FIG. 1 is an example schematic and block diagram of a display device.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey some of the aspects and features of the present invention to those skilled in the art. Accordingly, processes, elements, and techniques that are not necessary to those having ordinary skill in the art for a complete understanding of the aspects and features of the present invention are not described with respect to some of the embodiments of the present invention. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. However, when an element or layer is referred to as being "directly on," "directly connected to," or "directly coupled to" another element or layer, there are no intervening elements or layers present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present invention refers to "one or more embodiments of the present invention."

FIG. 1 shows a schematic and a block diagram of a display device 100, which includes a timing controller 110, a scan driver 120, a data driver 130, and a plurality of pixels 160 in a display panel 140. Each of the plurality of pixels 160 is coupled to respective scan lines SL1 to SLn, where n is a positive integer, and data lines DL1 to DLj, where j is a positive integer, at crossing regions of the scan lines SL1 to SLn and the data lines DL1 to DLj. Each of the pixels 160 receives a data signal from the data driver 130 through the respective one of the data lines DL1 to DLj, when a scan signal is received from the scan driver 120 through a respective one of the scan lines SL1 to SLn.

The timing controller 110 receives an image signal IMAGE, a synchronization signal SYNC, and a clock signal CLK from an external source (e.g., external to the timing controller). The timing controller 110 generates image data DATA, a data driver control signal DCS, and a scan driver control signal SCS. The synchronization signal SYNC may include a vertical synchronization signal Vsync and a horizontal synchronization signal Hsync.

The timing controller 110 is coupled to the data driver 130 and the scan driver 120. The timing controller 110 transmits the image data DATA and the data driver control signal DCS to the data driver 130, and transmits the scan driver control signal SCS to the scan driver 120.

Figure 2:
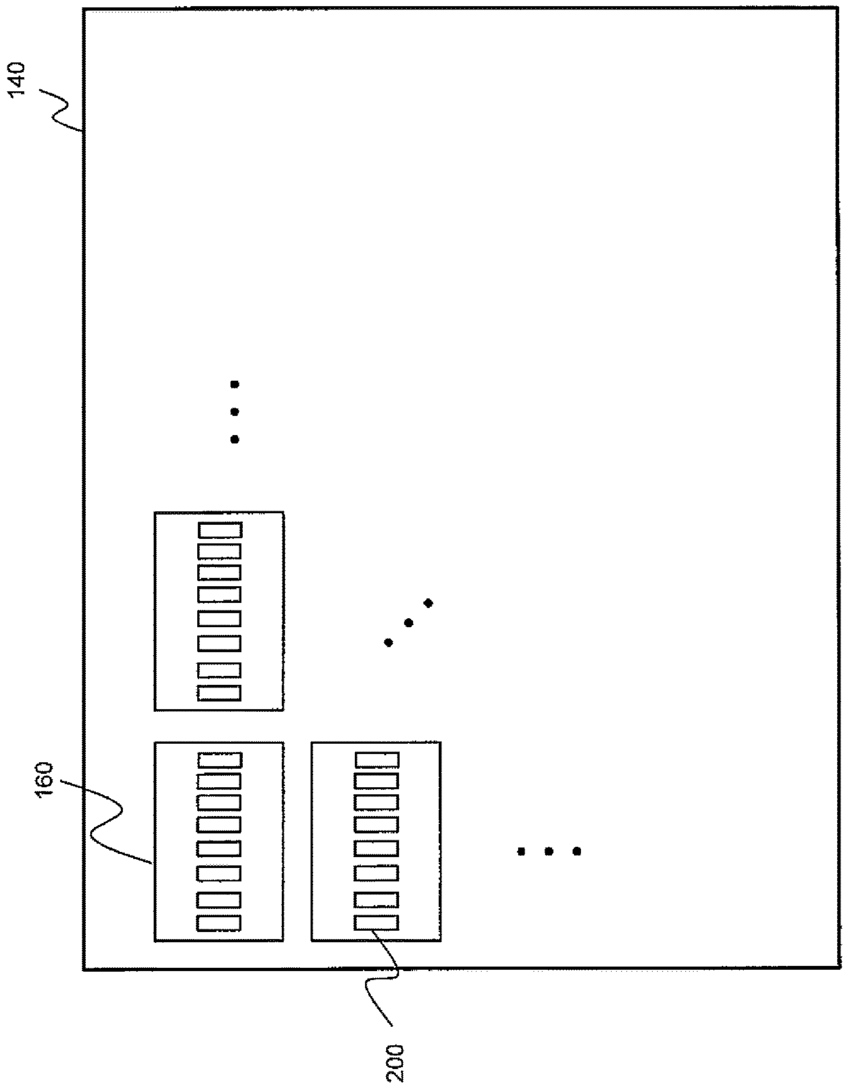
FIG. 2 shows a magnified view of a display panel of the display device shown in FIG. 1.
Figure 3:
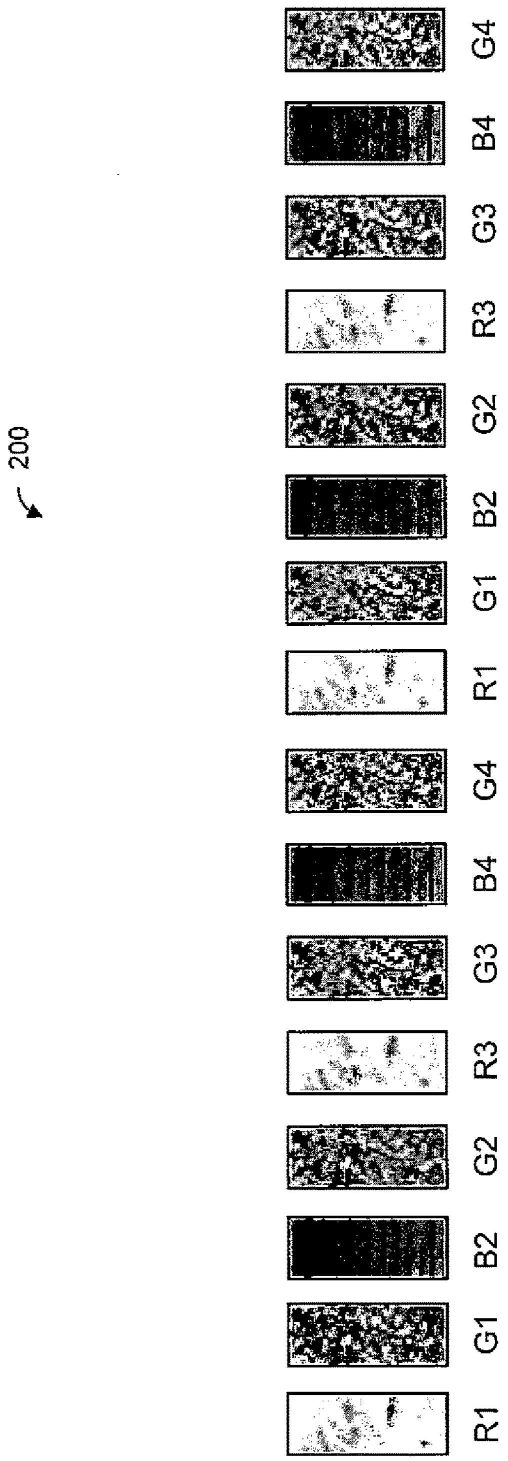
FIG. 3 is an illustration of an example color sub-pixel layout having a 4:2:2 color sampling scheme.

FIG. 2 shows a magnified view of the plurality of pixels 160 in the display panel 140. Each of the plurality of pixels 160 includes a plurality of sub-pixels 200 having an R1 G1 B2 G2 R3 G3 B4 G4 layout, as shown in more detail in FIG. 3, where R represents a red sub-pixel, G represents a green pixel, and B represents a blue pixel. This arrangement would be understood by a person having ordinary skill in the art as having a 4:2:2 color sampling (i.e., each pixel corresponding to two sets of eight color sub-pixels). While a 4:2:2 color sampling layout is described herein as an example, the description is not intended to be limiting. Thus, the pixels can have other arrangements know to those skilled in the art, such as, for example, 4:4:4.

Variation of the luminance of pixels, which may be caused by a variation in a driving current of a pixel driving circuit in an OLED display panel, is inherent to each display panel. Therefore, according to embodiments of the present invention, when the display panel is manufactured, the sub-pixels can be measured to determine a compensation parameter that is specific to each particular sub-pixel so that the luminance levels of the sub-pixels are within an allowable range. In this way, display panels can be calibrated during manufacturing so that the variation is compensated for during operation. The variation can be modeled into per-pixel or per-sub-pixel compensation parameters and digital compensation logic can be introduced as a post-manufacturing solution to maintain the color variation under a perceivable threshold. The per-pixel compensation parameters (or "parameters" hereinafter), are generally stored in memory for use by the digital compensation logic. The digital compensation logic compensates the display panel's pixels at various luminance levels. Each pixel may have multiple parameters that correspond to color variation at different luminance levels. For example, for a UHD-4K (3840×2160 resolution) panel with 4:2:2 color sampling, representing each sub-pixel parameter with, for example, 8 bits, may result in 128 megabits (Mb) of parameter information for a single luminance level. Storing parameters with 8 bits for three luminance levels (e.g., high, medium, low luminance levels) would thus result in 384 Mb of parameter information. Storing 384 Mb of parameter data at the display level would increase the needed amount of storage memory to one that is too expensive to be equipped on a display panel. In many cases the memory size of some display panels may be only a few megabits. Thus, reducing the memory size requirements of the display panels can reduce manufacturing costs.

One method to reduce the memory requirement for storing the parameters is to reduce the number of parameters that are stored in memory, for example, by storing only one parameter for a plurality of pixels or sub-pixels. However, merely reducing the number of parameters (e.g., by grouping the plurality of pixels or sub-pixels together) could reduce the effectiveness of any compensation logic using the parameters and may consequently degrade the image quality, especially when the size of the group is large.

Figure 4:
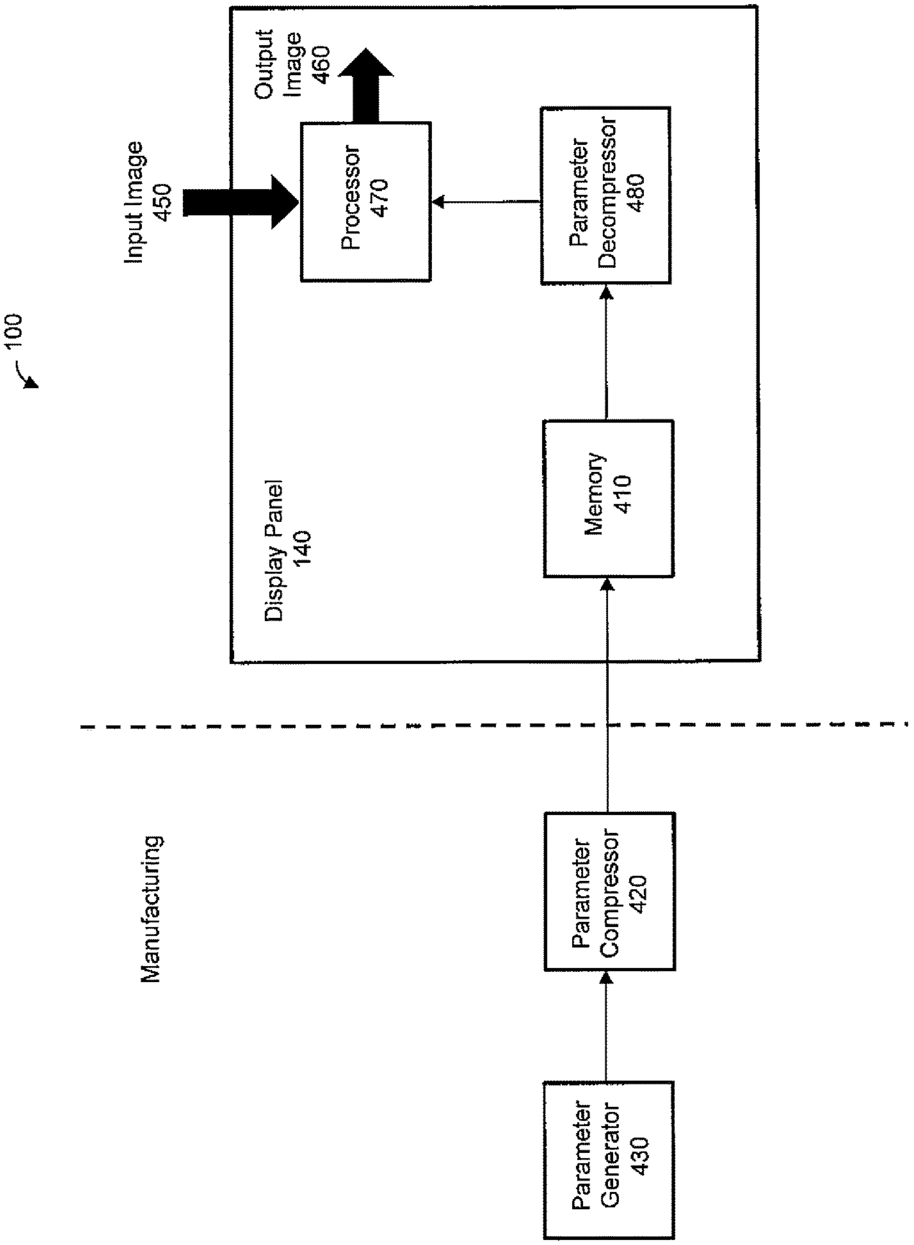
FIG. 4 is a block diagram of the display panel of FIG. 1 showing information flow of pixel parameters from the calibration phase during manufacturing.

FIG. 4 shows the display panel 140 and a block diagram according to an embodiment that illustrates a method of compensating for the color variation of the pixels while reducing the memory requirements.

As illustrated in FIG. 4, the parameter for some of the sub-pixels is generated by a parameter generator 430 and parameter residuals (hereinafter "residuals") are predicted for some of the sub-pixels based on the generated parameters in a pixel parameter compressor 420, which together form the parameters for all of the sub-pixels of the display panel. The generated parameters and the predicted residuals are compressed and encoded by the pixel parameter compressor 420 and the compressed parameters are provided to the memory 410 for storage. The parameter generator 430 and the compressor 420 are utilized during manufacturing and therefore may be located separately from and external to the display panel 140. For example, the parameter generator 430 and the compressor 420 may be an external hardware or software module that is coupled with the display device 140 during manufacturing for calibration.

The display panel 140 includes a memory 410 for storing the parameters and a pixel parameter decompressor 480 for decoding and decompressing the encoded and compressed parameters that are retrieved from the memory 410. The display panel 140 also includes a pixel processor 470 for processing an input image 450. That is, the decoded and decompressed parameter provided from the decompressor 480 is applied to the input image in the pixel processor 470 to compensate for color variation by the sub-pixel. The compensated image, which is an adjusted input image, is displayed by the sub-pixel on the display panel 140 as an output image 460. As such, the compression of the parameters and the residuals maintain a relatively high fidelity of the parameters, while providing light-weight computation that allows for the decoding of compressed parameters at the same rate as the sub-pixels are rendered to the display.

The pixel processor 470 may be a processor such as a central processing unit (CPU) which executes program instructions stored in a non-transitory medium (e.g., a memory) and interacts with other system components to perform various methods and operations according to embodiments of the present invention.

The memory 410 may be an addressable memory unit for storing instructions to be executed by the processor 470 such as, for example, a drive array, a flash memory, or a random access memory (RAM) for storing instructions used by the display device 100 that causes the processor 470 to execute further instructions stored in the memory.

The processor 470 may execute instructions of a software routine based on the information stored in the memory 410. A person having ordinary skill in the art should also recognize that the process may be executed via hardware, firmware (e.g. via an ASIC), or in any combination of software, firmware, and/or hardware. Furthermore, the sequence of steps of the process is not fixed, but can be altered into any desired sequence as recognized by a person of skill in the art. A person having ordinary skill in the art should also recognize that the functionality of various computing modules may be combined or integrated into a single computing device, or the functionality of a particular computing module may be distributed across one or more other computing devices without departing from the scope of the exemplary embodiments of the present invention.

Figure 5:
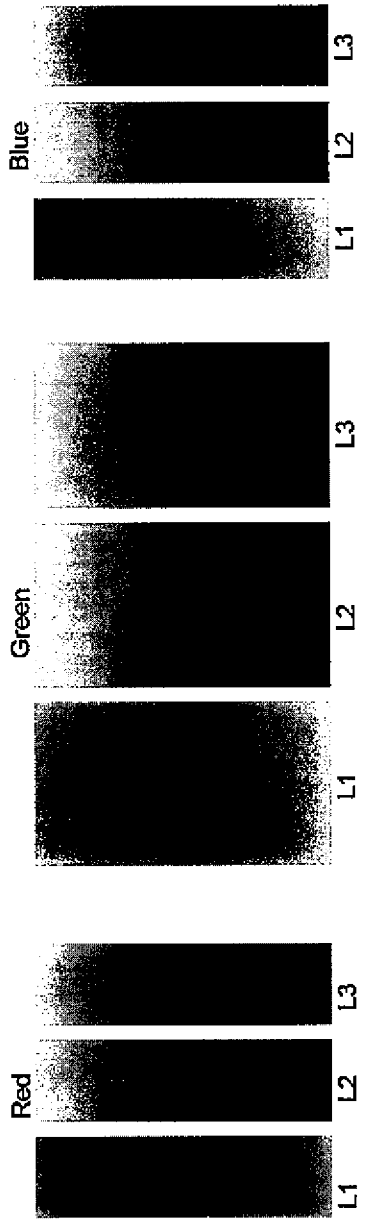
FIG. 5 shows an example of the parameters for red, green, and blue sub-pixels each having three luminance levels.

FIG. 5 shows an example of the parameters for red, green, and blue sub-pixels each having three luminance levels on a 1080×1920 panel, where L1, L2, and L3 correspond to low, medium, and high luminance levels, respectively. The parameters may be normalized to a range of [0, 255]. Although only three luminance levels are shown in this example, other embodiments may include more than three luminance levels of parameters generated for the display panel.

According to an embodiment of the present invention, the parameters model variations of colors of the sub-pixels (e.g., red, green and blue) to produce a color at a given luminance level (e.g., high, mid and low levels). Each generated sub-pixel parameter, when quantized into a range of [0, 255], can be represented by 8 bits. Thus, each of the sub-pixels may be compensated by applying the parameter to the input image signal for the corresponding sub-pixel.

In some embodiments, instead of generating a parameter for each of the sub-pixels, a hierarchical prediction may be utilized for compressing the multi-channel and multi-luminance-level parameters. That is, the parameters for some of the sub-pixels may be hierarchically predicted as residuals from known parameters of other sub-pixels (e.g., adjacent sub-pixels). For example, the parameters corresponding to different color sub-pixels are correlated due to their spatial adjacencies (e.g., spatial adjacencies of L2 of red and L2 of blue with L2 of green). Therefore, according to an embodiment, inter-channel prediction may be performed between the parameters of adjacent color sub-pixels and inter-level prediction may be performed between parameters of the same color having different luminance levels. That is, residuals may be determined by performing inter-channel prediction and/or inter-level prediction.

Figure 6:
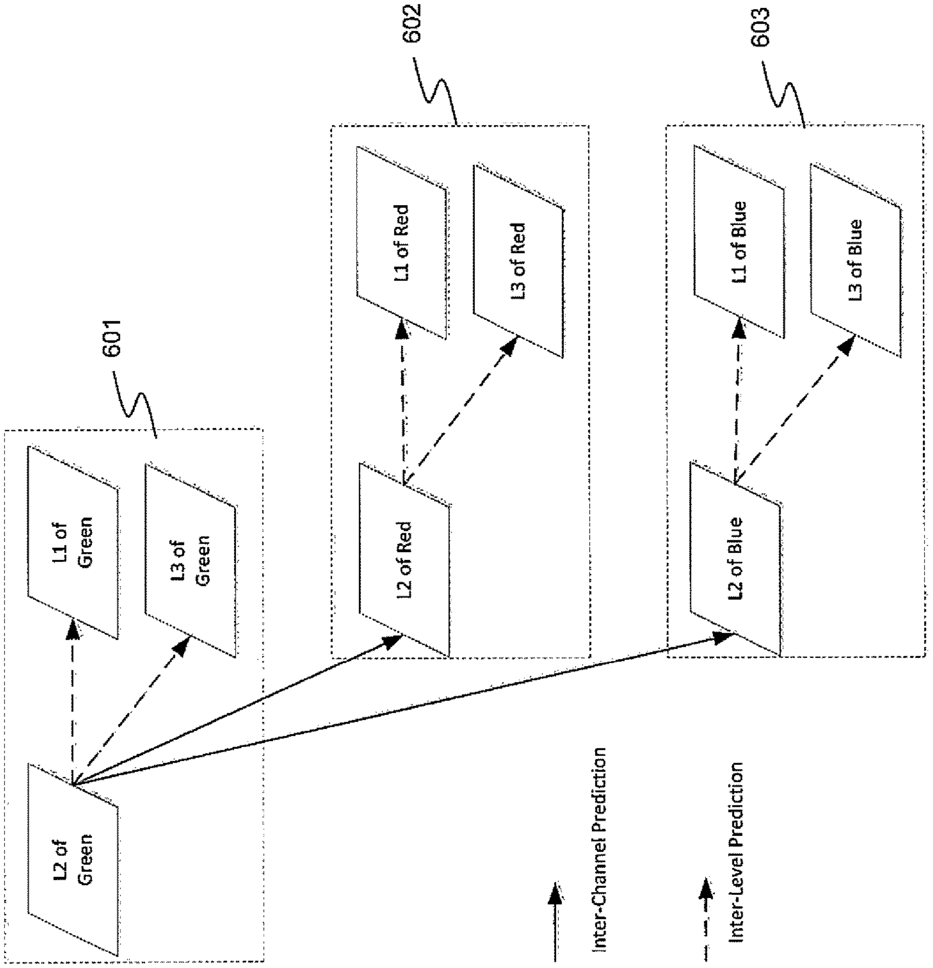
FIG. 6 shows a block diagram corresponding to parameters for green, red, and blue sub-pixels, each including sub-pixel parameters for three luminance levels.

FIG. 6 shows a block diagram corresponding to parameters for a green sub-pixel 601, a red sub-pixel 602, and a blue sub-pixel 603. Each corresponding parameter box 601, 602, 603 includes sub-pixel parameters for the three luminance levels L1, L2, L3 for each color. According to the embodiment, a base channel (or base color channel) is initially selected as the starting point (or the starting parameter). In the example shown in FIG. 6, a green sub-pixel 601 is selected as the base channel. In particular, the mid luminance level L2 parameter for the green sub-pixel 601 is selected as a base level (or base luminance level) and the base channel, respectively. While any color may be selected as the base channel, the green color may be selected as the base channel because it has a full per-pixel resolution and because the green channel generally has the least amount of noise. The term "channel" as used herein refers to a color of a sub-pixel for which the parameter corresponds, among all of the sub-pixel parameters.

Once the base channel is selected (e.g., L2 of green) inter-channel prediction is performed to obtain parameters of the other channels (e.g., L2 of red and/or L2 of blue) for the same luminance level (e.g., L2). That is, the parameter from the mid luminance level L2 of the green sub-pixel is utilized to predict the mid luminance level L2 parameter for the red and blue sub-pixels. Then, the difference between the L2 green parameter and the L2 red/blue parameters are calculated to obtain residuals of L2 red/blue. That is, the L2 red/blue residuals make up the difference between the L2 green parameter and the L2 red/blue parameters. Consequently, by storing the base channel parameter and the residual of the other channel, instead of storing both the base channel parameter and the parameter of the other channel, memory space can be conserved.

According to an embodiment, the inter-channel prediction may be performed by calculating the difference between the red sub-pixel parameter and an encoded-the-decoded version of the green sub-pixel parameter. For example, the prediction can be represented as:

$$d_R(i,j)=R(i,j)-\hat{G}(i,j) \qquad (1)$$

where R(i,j) denotes the red sub-pixel parameter, where (i,j) indicates the pixel position, and $\hat{G}$(i,j) denotes the encoded-then-decoded version of the green sub-pixel parameter that corresponds to the same pixel (i,j). According to this example, R(i,j) and G(i,j) have a range of [0, 255], and therefore the residual $d_R$(i,j) has a range of [−255, 255].

Performing the inter-channel prediction results in residual $d_R$ for the red sub-pixel parameter, which will later be encoded. In some embodiments, when reconstructing the predicted red parameter, the decoded version of the residual, denoted as $\hat{d}_R$, will be used together with decoded green sub-pixel parameter $\hat{G}$ to reconstruct the predicted base level red parameter, which can be presented as:

$$\hat{R}(i,j)=\hat{d}_R(i,j)+\hat{G}(i,j) \qquad (2)$$

The same process may be repeated for predicting the base level parameter of another channel (e.g., the blue channel), and the above notations still apply by replacing "R" with "B". The reconstructed parameters, $\hat{G}$, $\hat{R}$ and $\hat{B}$, will be used as the bases for the inter-level prediction for each of the three channels, which will be described in more detail later. Thus, the inter-channel prediction may be performed between the base level (e.g., L2) of the base channel (e.g., green) and the base level of the other channels (e.g., red and blue) of the same level (e.g., L2) to determine the residuals.

According to another embodiment, inter-level prediction may be performed between the base level of each color channel and the other levels of the same color channel. That is, residuals of L1 and L3 of green may be determined from L2 of green (i.e., base channel and base level), L1 and L3 of red may be determined from L2 of red, and L1 and L3 of blue may be determined from L2 of blue. While only two levels are predicted within each channel in the example embodiment of FIG. 5, a person having ordinary skill in the art would recognize that more levels can be predicted by following substantially similar steps.

For purposes of describing the inter-level prediction herein, a color channel is denoted as X, where X=R, G, or B. The reconstructed base level parameter X is denoted as $\hat{X}_0$, which is generated by the inter-channel prediction as described above, and a non-base level parameter as $X_k$, k≠0.

Differently from the inter-channel prediction where the prediction is performed by calculating the per-pixel difference, the inter-level prediction from $\hat{X}_0$ to $X_k$ is performed on a block basis and via a parametric model. That is, same prediction parameters (α, β) are used for a region of adjacent parameters assuming local linearity of the data. In some embodiments, the parametric model may be a linear regression model. For example, the linear regression model predicts a vector U (where U is a block of pixel parameters of $X_k$) from a vector V (where V is a block of reconstructed pixel parameters of $\hat{X}_0$) by determining a linear transformed version of B with two prediction parameters, (α, β):

$$\hat{V}=\alpha V+\beta \qquad (3)$$

The parameters (α, β) may be determined such that the mean squared error between U and $\hat{V}$ is minimized:

$$\text{argmin}=_{\alpha,\beta}\|U-\hat{V}\|^2 \quad (4)$$

For each block of pixel parameters of $X_k$, the linear regression based prediction results in a pair of prediction parameters (α, β) and a residual for each pixel parameter in the block. The prediction parameters are encoded together with the residuals in order to reconstruct the block at a decoder.

Figure 7A:
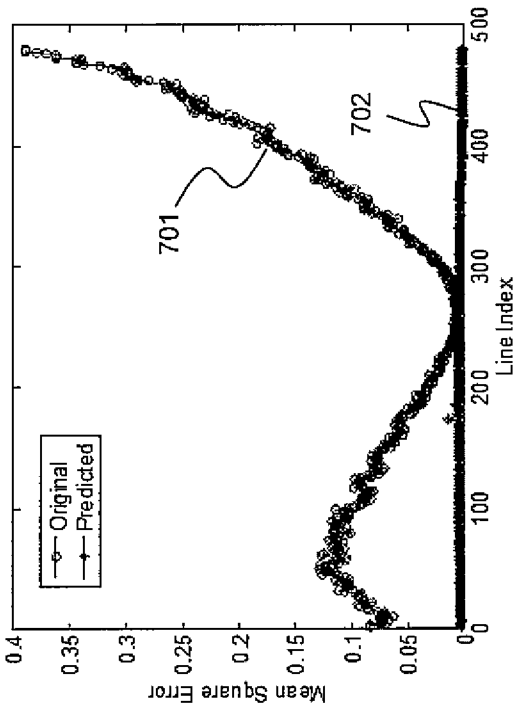
FIGS. 7A-7B show example results for predicting pixel parameters for two different luminance levels from a base level.
Figure 7B:
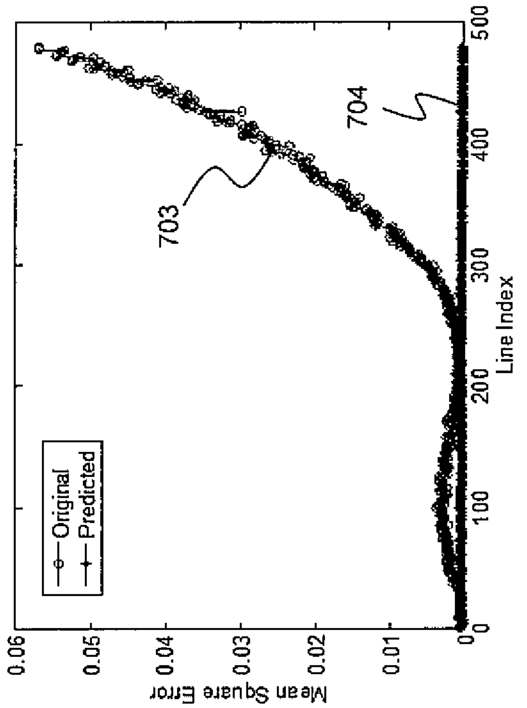

The effectiveness of the inter-level prediction is shown in FIGS. 7A and 7B, where the results for predicting L1 and L3 parameters from L2 (e.g., the base level) of the red channel parameters, respectively, is shown. The plots indicated as 701 and 703 in FIGS. 7A and 7B, respectively, show mean square errors between the original L1/L3 data and the L2 data, while the plots indicated as 702 and 704 show mean square errors between the predicted L1/L3 data and the L2 data. Each prediction unit includes shown in the example embodiment shows two lines of pixel parameters, and the x-axes indicate line indices, which correspond to different prediction units. From the plots, it can be seen that mean squared errors of the predicted L1/L3 data is significantly reduced compared to the mean squared errors of the original L1/L3. This indicated that that information that is compressed after the inter-level prediction is much less than the information in the original data, thus confirming the effectiveness of the prediction.

Figure 8:
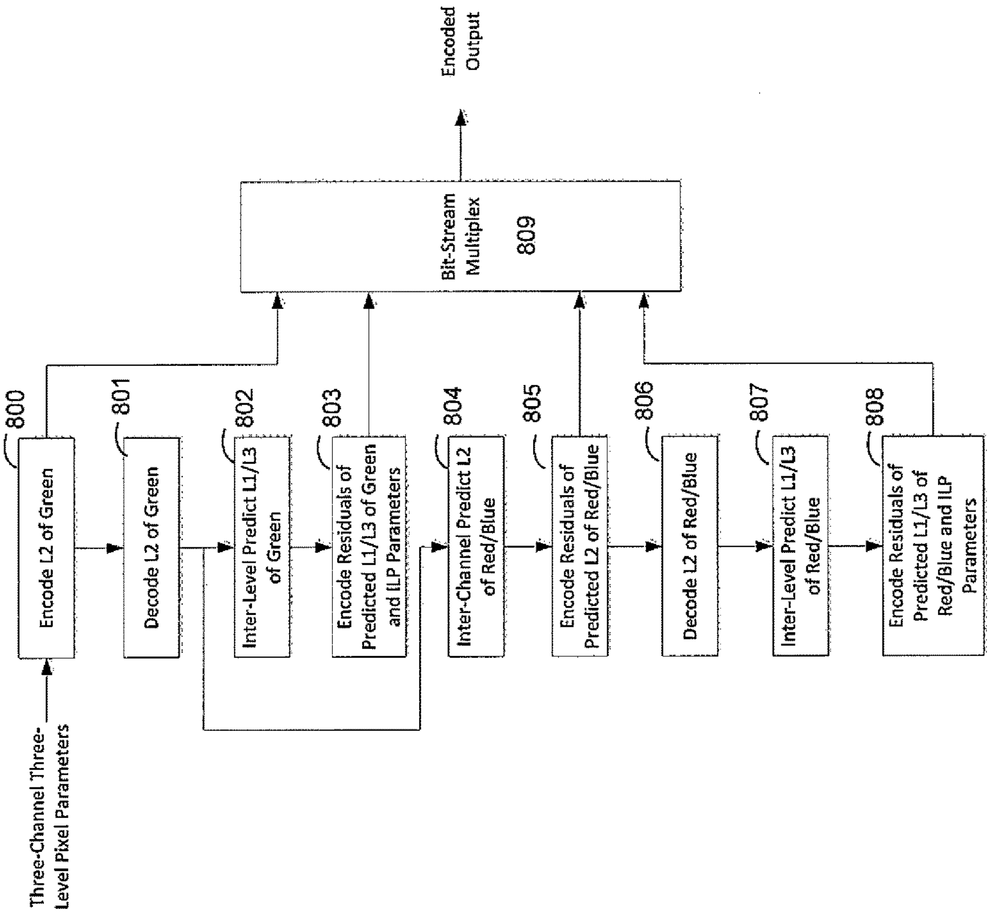
FIG. 8 is a flow diagram showing an encoding process of utilizing a hierarchical prediction method to compress pixel parameters.

FIG. 8 is a flow diagram showing an encoding process of the hierarchical prediction of parameters. As described previously, a base channel and a base level is first determined, wherein in the described example, the base channel and the base level is the mid luminance level L2 of the green sub-pixel. Accordingly, the parameter for the L2 of green is generated by the parameter generator 430 and is encoded at block 800. The encoded L2 green parameter is provided to a bit stream multiplexer 809, to be multiplexed with the other parameters and residuals. The encoded L2 green parameter is also decoded at block 801 so that the decoded L2 green parameter can be utilized to inter-channel predict the L2 red and L2 blue parameters. The difference between the L2 green parameter and the L2 red parameter, and the difference between the L2 green parameter and the L2 blue parameter are calculated to generate a residual between L2 green and L2 red, and residual between L2 green and L2 blue at block 804. The L2 red and L2 blue residuals are encoded at block 805 and provided to the bit stream multiplexer at block 809. The encoded L2 red and L2 blue residuals are decoded at block 806, and utilized to inter-level predict and generate the L1/L3 red/blue parameters at block 807. The differences between the predicted inter-level predicted L1/L3 red/blue parameters and the L2 red/blue parameters are calculated to generate residuals between the predicted inter-level predicted L1/L3 red/blue parameters and the L2 red/blue parameters. The L1/L3 red/blue residuals are encoded at block 808 and provided to the bit stream multiplexer 809.

Turning back to block 801, the decoded L2 green parameter also utilized to inter-level predict the L1 green and L3 green parameters at block 802. The difference between the inter-level predicted L1 and L3 green parameters and the L2 green parameter is calculated to generate residuals between the predicted L1 and L3 green parameters and the L2 green parameter. The residuals are encoded at block 803 and provided to the bit stream multiplexer 809. Accordingly, the encoding of the multi-channel, multi-level parameters include multiplexing the four sets of parameter and residual data, i.e., the parameter information for the base level of the base channel, residuals of each inter-channel prediction, residuals of each inter-level prediction, and the parameters utilized in the inter-level prediction (e.g., the linear regression parameters determined by Equation 4, above), by the bit stream multiplexer 809.

In some embodiments, the encoded parameters and the residuals of each inter-channel/inter-level prediction (e.g., blocks 800, 803, 805, 808) is multiplexed by the bit stream multiplexer 809 and the multiplexed output is encoded by grouping the parameters and the residuals into blocks and performing a transform-based encoding by applying a Haar or Hadamard transform followed by entropy coding.

Although the inter-channel and the inter-level prediction are performed in a hierarchical manner in the steps provided in the example embodiment of FIG. 8, each of the inter-channel and inter-level predictions are independent of each other and can be performed individually and in any order, or in parallel. For example, the inter-level prediction may be performed among the multiple levels of each color channel, respectively, while the parameters of each color channel may be encoded separately. A person having ordinary skill in the art would understand that other variations are possible and that each variation may have a varying degree of compression efficiency.

According to another embodiment, when the compressed parameters and the residual are retrieved from memory 410, the multiplexed parameters and the residual are demultiplexed to obtain the four individual sets of parameter and residual data, i.e., the parameter information for the base level of the base channel, residuals of each inter-channel prediction, residuals of each inter-level prediction, and the parameters utilized in the inter-level prediction. The residuals can be decoded together with the parameters to reconstruct the predicted parameters for each of the channels and the levels. According to an embodiment, the residuals can be decoded together with the parameters to reconstruct the predicted parameters. The parameters for each of the channels and the levels are decoded by decoding the residual data, reconstructing the corresponding predicted parameters, and adding together the residual data and the reconstructed parameters to form corresponding decoded parameters.

Figure 9:
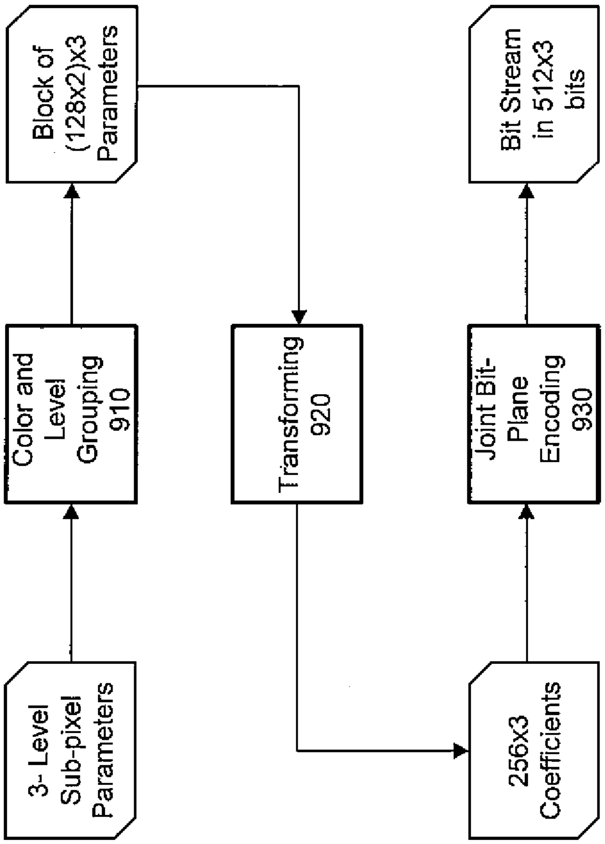
FIG. 9 is a flow diagram for encoding the pixel parameters.

FIG. 9 shows a flow diagram for compressing the parameters for multiple luminance levels by performing a Hadamard or Haar transform. According to the embodiment, the parameters or the residuals for all sub-pixels of the display panel are determined for the three different luminance levels (e.g., L1, L2, L3). The sub-pixels may be grouped into block or super blocks according to the color of the sub-pixels and the luminance levels at block 910. In this example embodiment, each super block may have a size of 768 parameters or residuals comprised of three blocks, each having 256 parameters or residuals. After grouping the parameters or residuals into the blocks or super blocks, a mathematical transform such as a Hadamard or Haar transform may be applied at block 920 to each of the 768 parameters to generate a sequence of 768 integer coefficients following a predefined scan order depending on the size of the block. The following integer transform can be applied:

$$T_2=H_1-H_2,$$

$$t=H_2+[T_2<<1],$$

$$T_1=H_3-t,$$

$$T_3=t+[T_1>>1],$$

where H represents the different luminance levels for each color sub-pixel (e.g., R, G, B) and T represents the actual values that are used for compression. By denoting $D(T_n)$ as the corresponding decoded values, then the following may be calculated:

$$t=D(T_3)-[D(T_1)>>1].$$

$$H_3=t+D(T_1),$$

$$H_2=t-[D(T_2)>>1],$$

$$H_1=H_2+D(T_2).$$

For some block sizes/arrangements, the scan order may be, for example, a progressive scan order, whereas for other block sizes/arrangements, the scan order may be a zigzag scan order. The coefficients are then packed into a sequence of bits (e.g., bit stream) by scanning the coefficients from the highest bit plane to the lower bit planes and encoding at block 930 the joint bit planes as runs of zero and signs for each non-zero coefficient. In some embodiments, the encoding of the runs of zero may be according to a variable-length code (VLC) table or in a fixed length form when the overhead is relatively small compared to encoding the residuals, as understood by those having ordinary skill in the art. The scanning and encoding continues until the targeted data size (e.g., 512×3 bits for 4-to-1 compression) is reached. In other words, each of the 768 parameters is scanned according to a predefined scanning order to apply a Hadamard or Haar transform to generate 768 integer coefficients. A code pre-generated code table (e.g., lookup table) is used to pack the coefficients into a sequence of bits by encoding 930. The foregoing Hadamard or Haar transform method is described by way of example and it not intended to be limiting. Moreover, further disclosure of the block-based transform and entropy coding may be described in a related U.S. patent application Ser. No. 14/658,039, filed on Mar. 13, 2015, the contents of which are incorporated herein by reference in its entirety.

The display device and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the display device may be formed on one integrated circuit (IC) chip or on separate IC chips. Further, the various components of the display device may be implemented on a flexible printed circuit film, a tape carrier package (TCP), a printed circuit board (PCB), or formed on a same substrate as the display device. Further, the various components of the display device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Although the present invention has been described with reference to the example embodiments, those skilled in the art will recognize that various changes and modifications to the described embodiments may be performed, all without departing from the spirit and scope of the present invention. Furthermore, those skilled in the various arts will recognize that the present invention described herein will suggest solutions to other tasks and adaptations for other applications. For example, the embodiment of the present invention may be applied to any image devices such as, for example, but not limited to, display panels, cameras, and printers, that store and retrieve device-specific per-pixel parameters for improving image quality.

It is the applicant's intention to cover by the claims herein, all such uses of the present invention, and those changes and modifications which could be made to the example embodiments of the present invention herein chosen for the purpose of disclosure, all without departing from the spirit and scope of the present invention. Thus, the example embodiments of the present invention should be considered in all respects as illustrative and not restrictive, with the spirit and scope of the present invention being indicated by the appended claims and their equivalents.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

What is claimed is:

1. A method of compensating pixel luminance of a display panel, the method comprising:

receiving, by a processor, pixel parameters corresponding to sub-pixels of the display panel, the pixel parameters comprising:

a first pixel parameter of a base luminance level of a base color channel;

a first residual determined from performing inter-channel prediction;

a second residual determined from performing inter-level prediction; and parameters used in the performing of the inter-level prediction;

receiving, by the processor, an input image;

compensating the pixel luminance of the display panel by adjusting, by the processor, the input image according to the pixel parameters; and displaying, by the processor, the adjusted input image at the display panel.

2. The method of claim 1, wherein the received pixel parameters are compressed pixel parameters.

3. The method of claim 2, further comprising decompressing, by the processor, the compressed pixel parameters before adjusting the input image.

4. The method of claim 2, wherein the pixel parameters are compressed by:

selecting, by the processor, the base color channel from a plurality of color channels;

selecting, by the processor, the base luminance level of the selected base color channel from a plurality of luminance levels;

determining, by the processor, the pixel parameter for the selected base color channel and the base luminance level; and predicting, by the processor, a second pixel parameter from the first pixel parameter to generate the first residual, the second pixel parameter corresponding to a color channel different from the base color channel, and corresponding to a same luminance level as the base luminance level.

5. The method of claim 4, wherein the pixel parameters are compressed further by:

predicting, by the processor, a third pixel parameter from the predicted second pixel parameter to generate the second residual, the third pixel parameter corresponding to a same color channel corresponding to the second pixel parameter, and corresponding to a luminance level different from the luminance level corresponding to the second pixel parameter; and encoding the first pixel parameter, the first residual, and the second residual.

6. A method for compressing pixel parameters, the method comprising:

selecting, by a processor, a base color channel from a plurality of color channels;

selecting, by the processor, a base luminance level of the selected base color channel from a plurality of luminance levels;

determining, by the processor, a first pixel parameter for the selected base color channel and the base luminance level; and predicting, by the processor, a second pixel parameter from the first pixel parameter to generate a first residual, the second pixel parameter corresponding to a color channel different from the base color channel, and corresponding to a same luminance level as the base luminance level.

7. The method of claim 6, further comprising:

predicting, by the processor, a third pixel parameter from the predicted second pixel parameter to generate a second residual, the third pixel parameter corresponding to a same color channel corresponding to the second pixel parameter, and corresponding to a luminance level different from the luminance level corresponding to the second pixel parameter; and encoding the first pixel parameter, the first residual, and the second residual.

8. The method of claim 7, wherein the predicting the second pixel parameter comprises an inter-channel prediction.

9. The method of claim 7, wherein the second residual is a difference between the second pixel parameter and the third pixel parameter.

10. The method of claim 7, wherein the predicting the third pixel parameter comprises an inter-level prediction.

11. The method of claim 10, wherein the inter-level prediction comprises performing a linear regression.

12. The method of claim 6, wherein the first residual is a difference between the first pixel parameter and the second pixel parameter.

13. The method of claim 6, further comprising multiplexing the first pixel parameter, the first residual, and the second residual.

14. A display panel, comprising:

a memory comprising compressed parameters for sub-pixels of the display panel;

a decoder configured to decompress the compressed parameters; and a processor configured to apply the decompressed parameters to input image signal, each parameter of the parameters corresponding to respective ones of the sub-pixels, wherein the parameters are compressed by:

selecting a base color channel from a plurality of color channels;

selecting a base luminance level of the selected base color channel from a plurality of luminance levels;

determining a first pixel parameter for the selected base color channel and the base luminance level;

predicting a second pixel parameter from the first pixel parameter to generate a first residual, the second pixel parameter corresponding to a color channel different from the base color channel, and corresponding to a same luminance level as the base luminance level;

predicting a third pixel parameter from the predicted second pixel parameter to generate a second residual, the third pixel parameter corresponding to a same color channel corresponding to the second pixel parameter, and corresponding to a luminance level different from the luminance level corresponding to the second pixel parameter; and encoding the first pixel parameter, the first residual, and the second residual.

15. The display panel of claim 14, wherein the predicting the second pixel parameter comprises an inter-channel prediction.

16. The display panel of claim 14, wherein the predicting the third pixel parameter comprises an inter-level prediction.

17. The display panel of claim 16, wherein the inter-level prediction comprises performing a linear regression.

18. The display panel of claim 14, wherein the first residual is a difference between the first pixel parameter and the second pixel parameter.

19. The display panel of claim 14, wherein the second residual is a difference between the second pixel parameter and the third pixel parameter.

20. The display panel of claim 14, further comprising multiplexing the first pixel parameter, the first residual, and the second residual.

* * * * *